United States Patent [19]

Davies

[11] 4,000,870
[45] Jan. 4, 1977

[54] MODULAR SYSTEM FOR QUICK CONVERSION OF AIRCRAFT PASSENGER COMPARTMENTS TO CARGO BAGGAGE/COMPARTMENTS

[75] Inventor: David J. Davies, Everett, Wash.
[73] Assignee: Western Gear Corporation, Lynwood, Calif.
[22] Filed: Sept. 8, 1975
[21] Appl. No.: 610,999
[52] U.S. Cl. .............................. 244/118 R; 214/84
[51] Int. Cl.² ...................... B64C 1/20; B64D 9/00
[58] Field of Search .................. 244/118 R, 137 R; 214/84; 105/375, 463, 464

[56] References Cited
UNITED STATES PATENTS 3,262,588 7/1966 Davidson ................... 244/137 R X
3,906,870 9/1975 Alberti ....................... 244/137 R X Primary Examiner—Trygve M. Blix
Assistant Examiner—Barry L. Kelmachter
Attorney, Agent, or Firm—Huebner & Worrel

[57] ABSTRACT

The modular system for quickly converting aircraft passenger compartments into cargo compartments and vice versa comprises floor forming panels, each panel being a complete module of the system. The individual panels are lightweight, having quick connect and disconnect fittings for securing to the aircraft, whereby the panels form a cargo supporting floor. Each panel has conveyor elements to move the cargo, to guide the cargo on the panels, and to hold the cargo in place in the aircraft on the panels.

27 Claims, 36 Drawing Figures

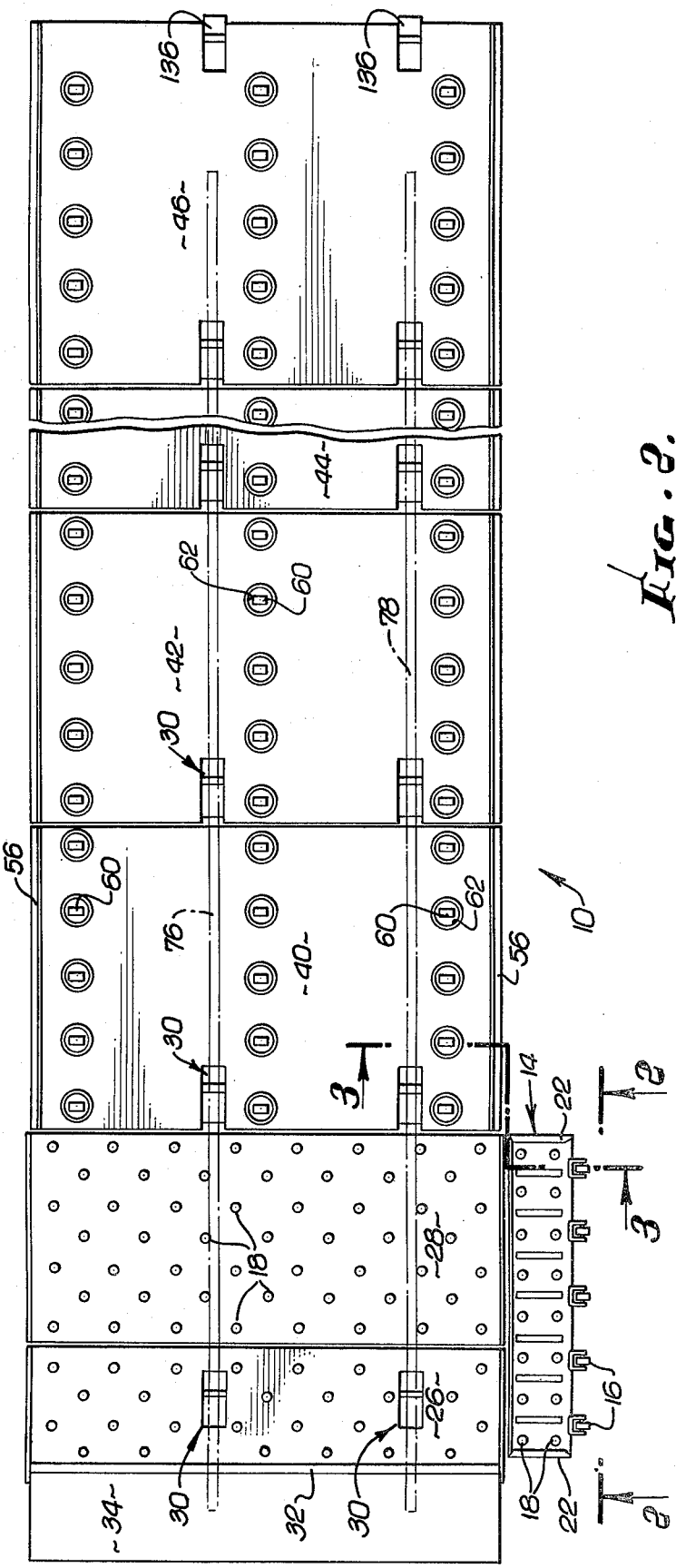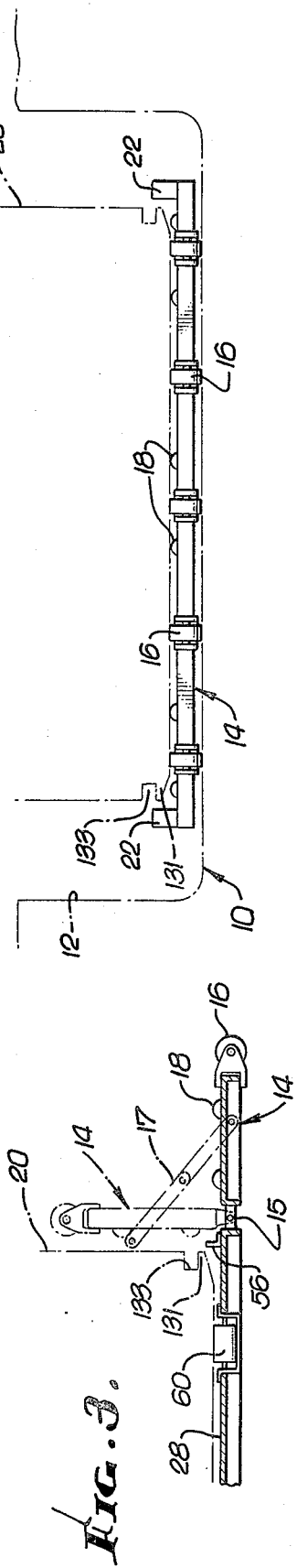

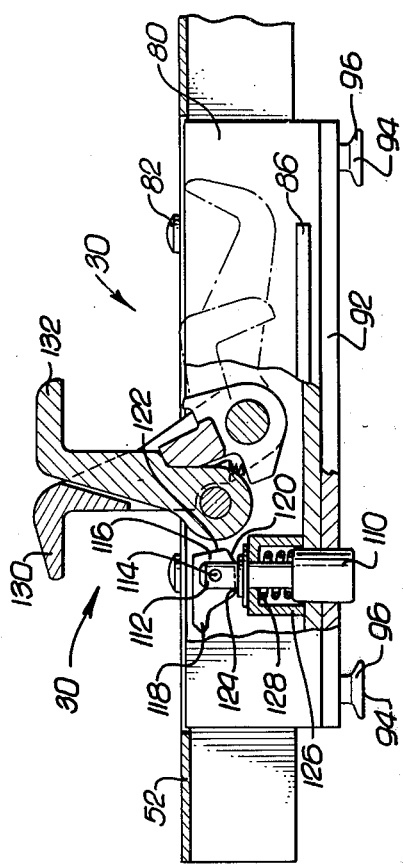
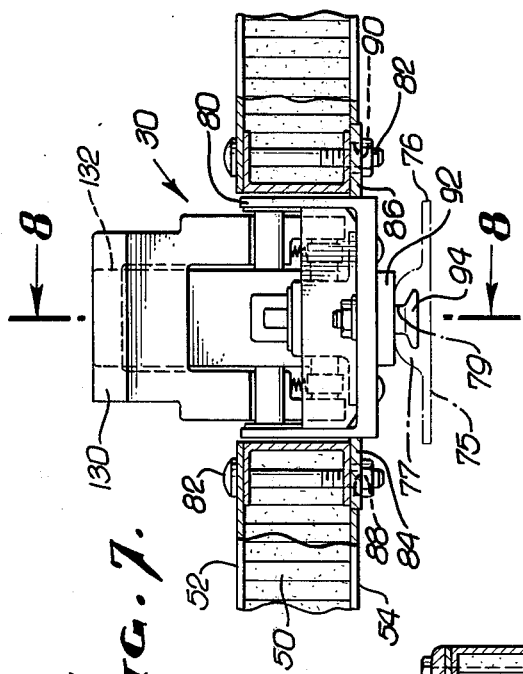
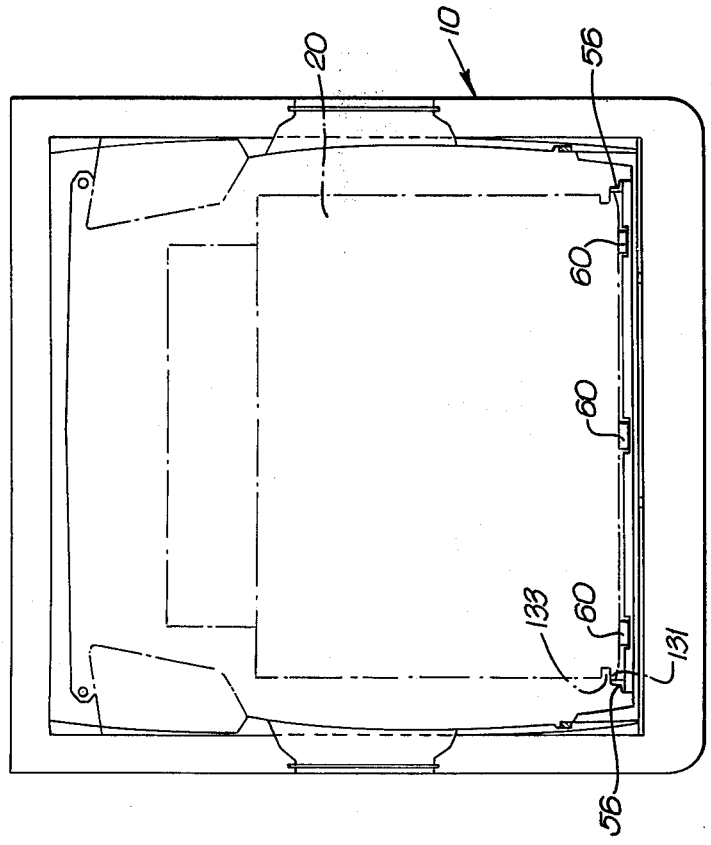
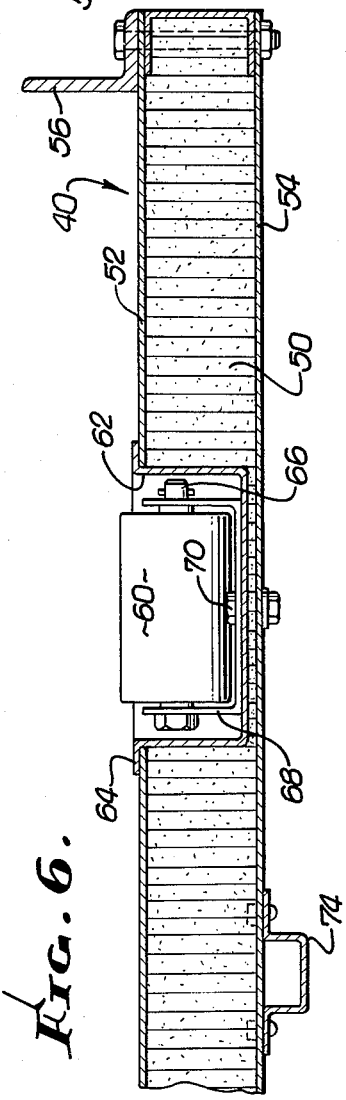

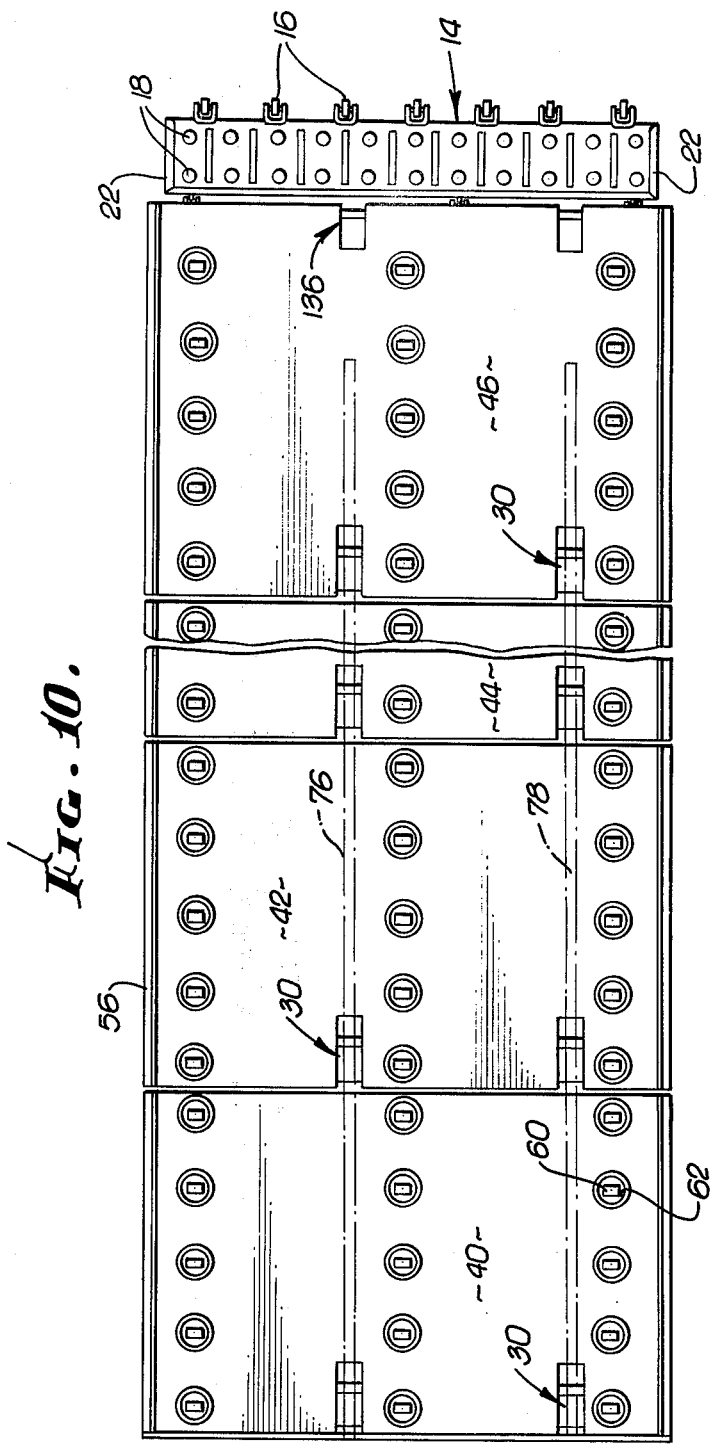

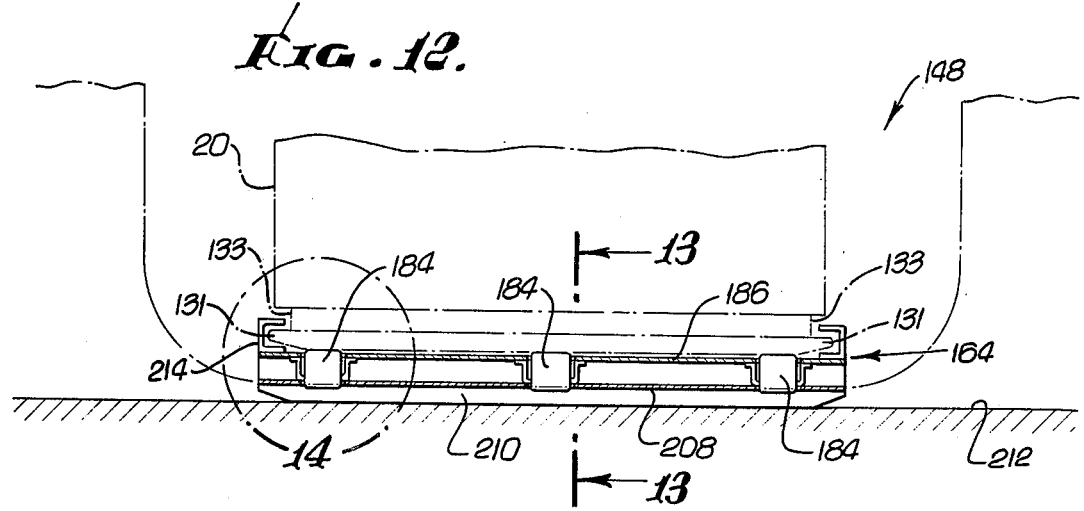
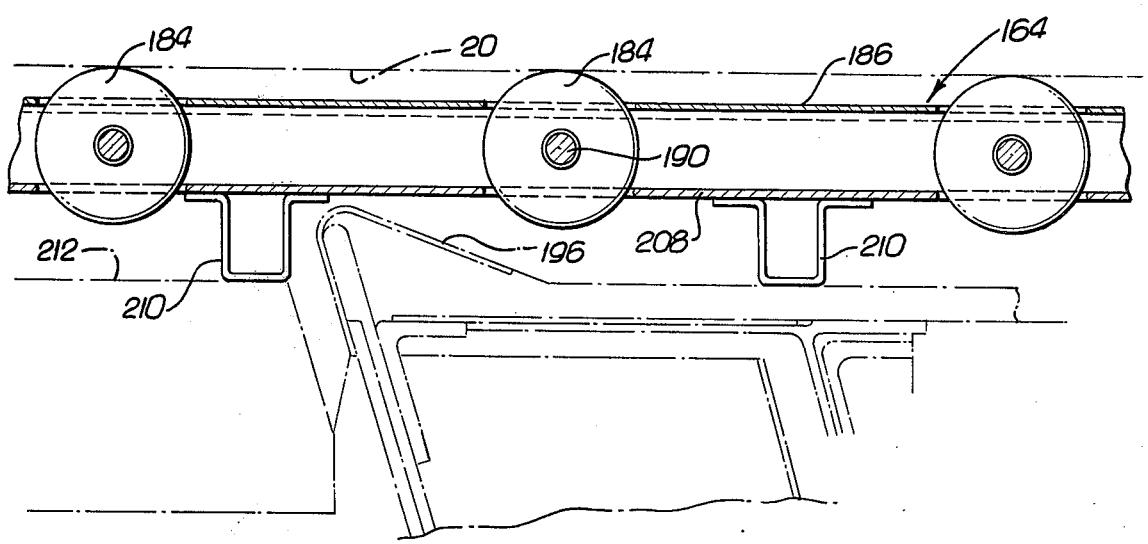
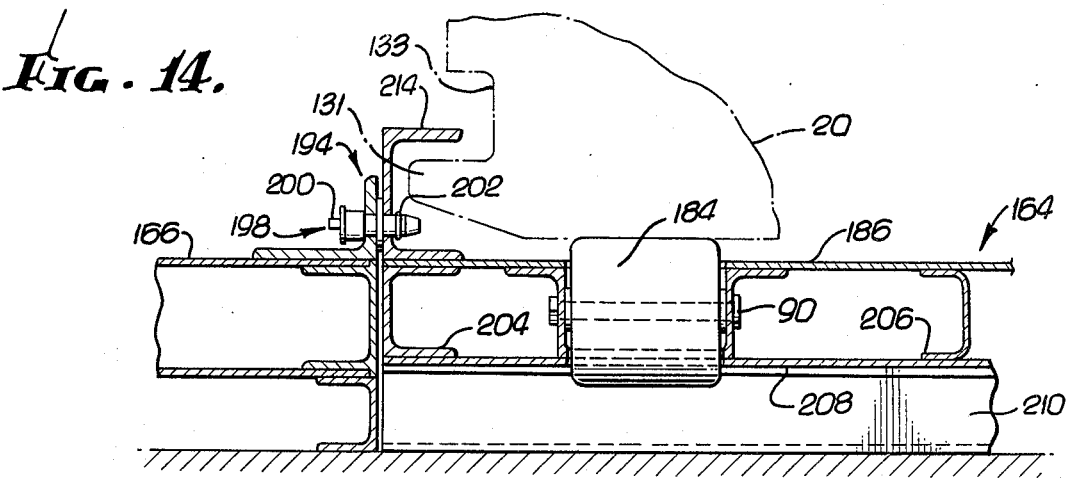

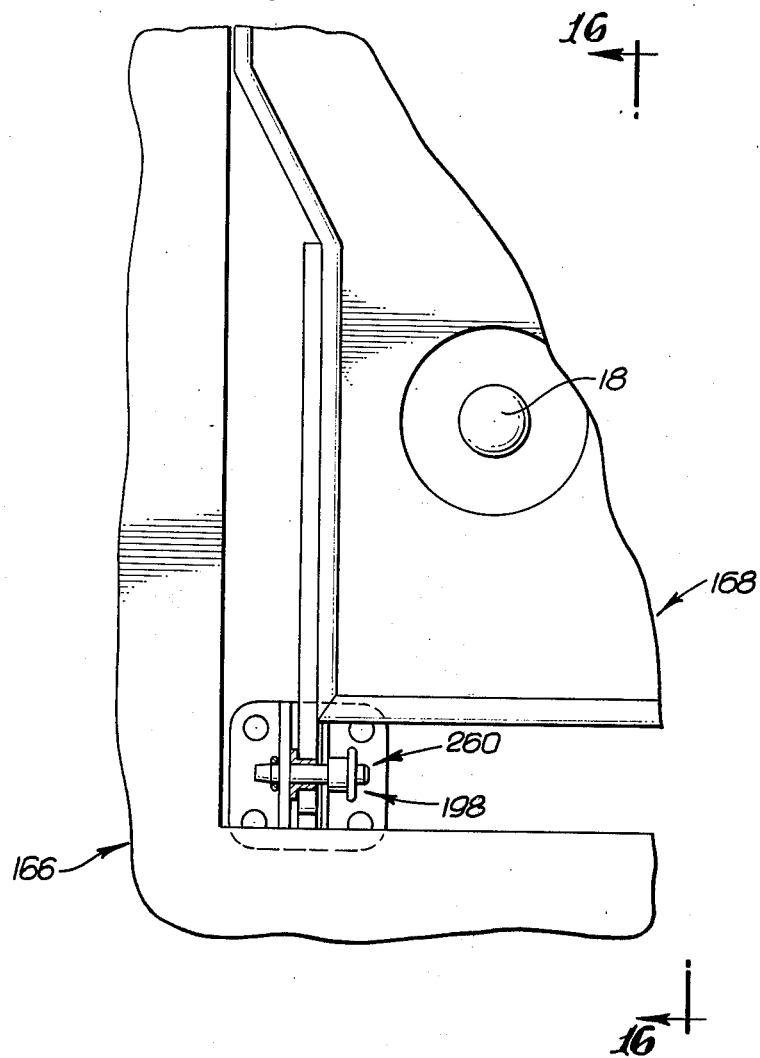
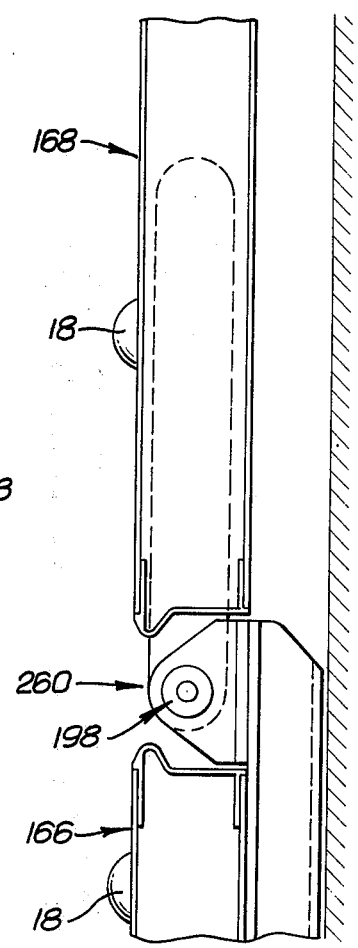
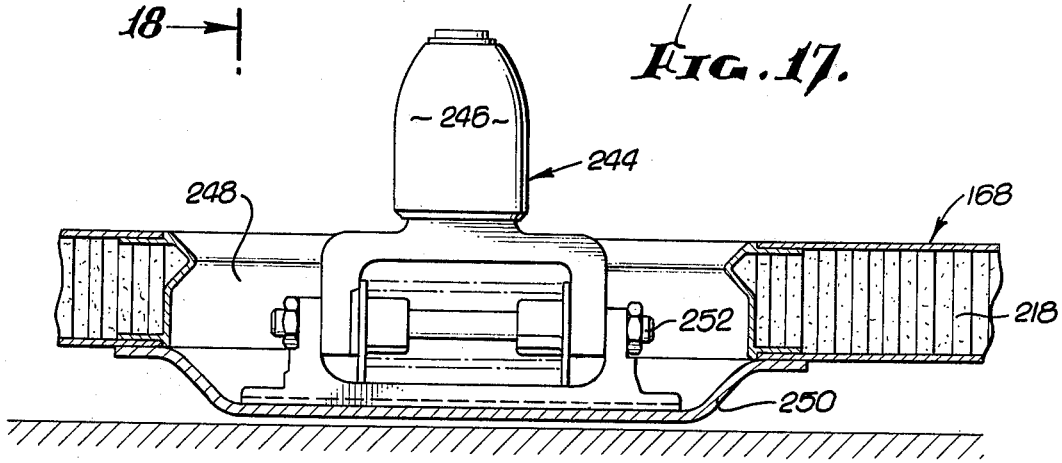

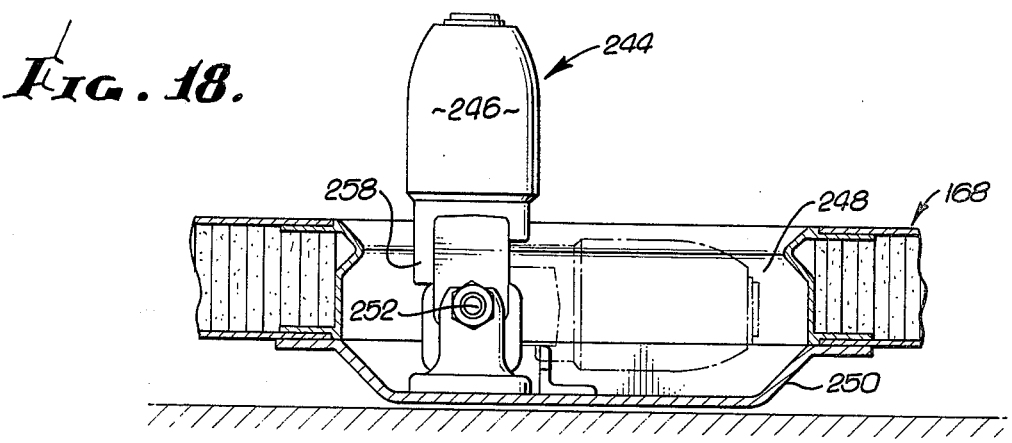
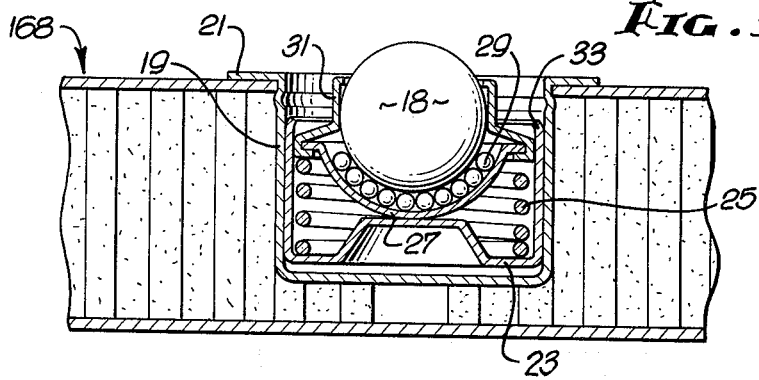
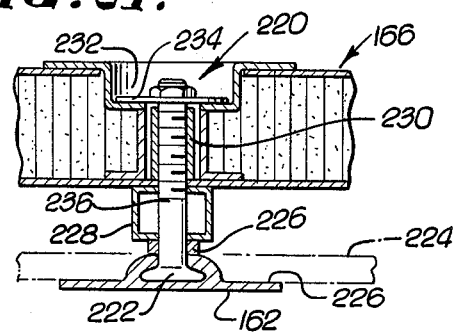
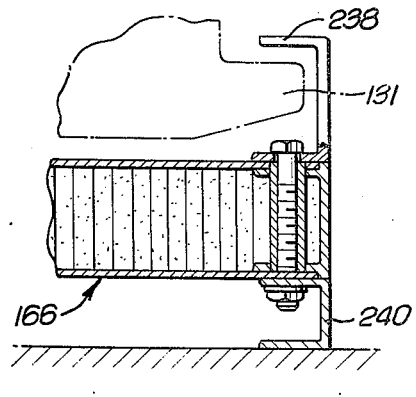
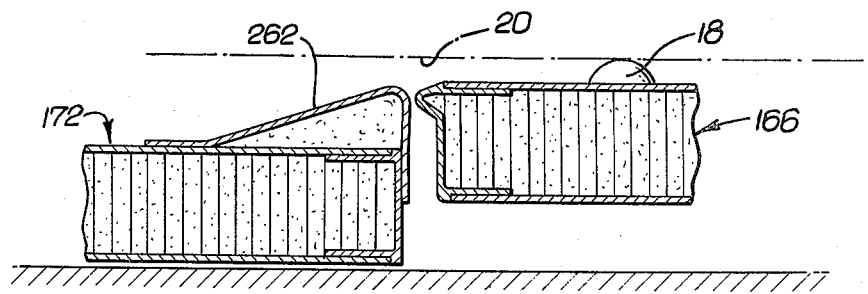

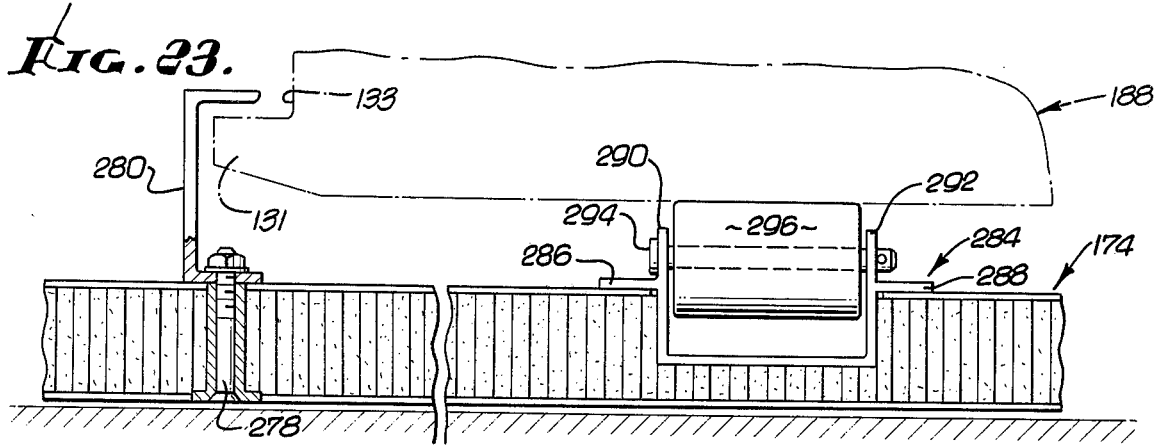
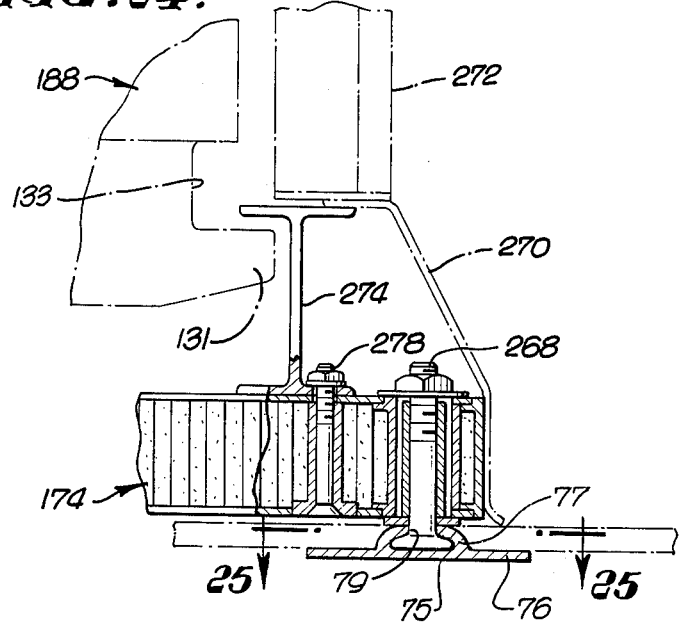
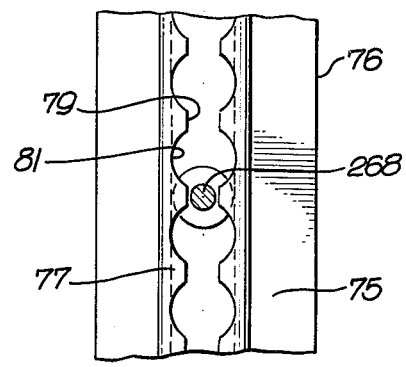
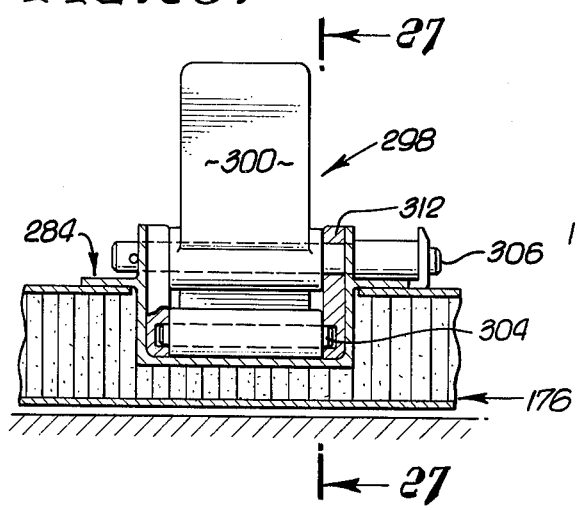
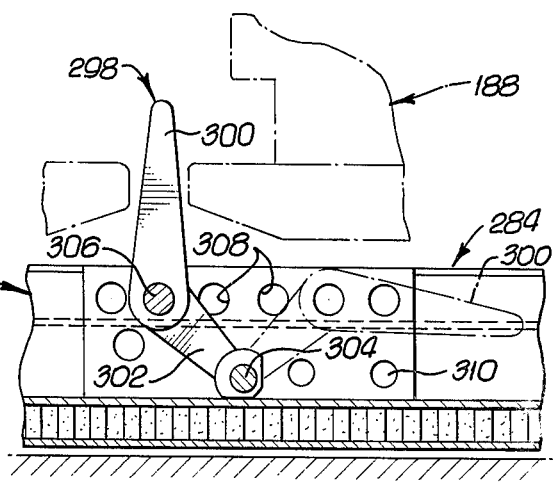

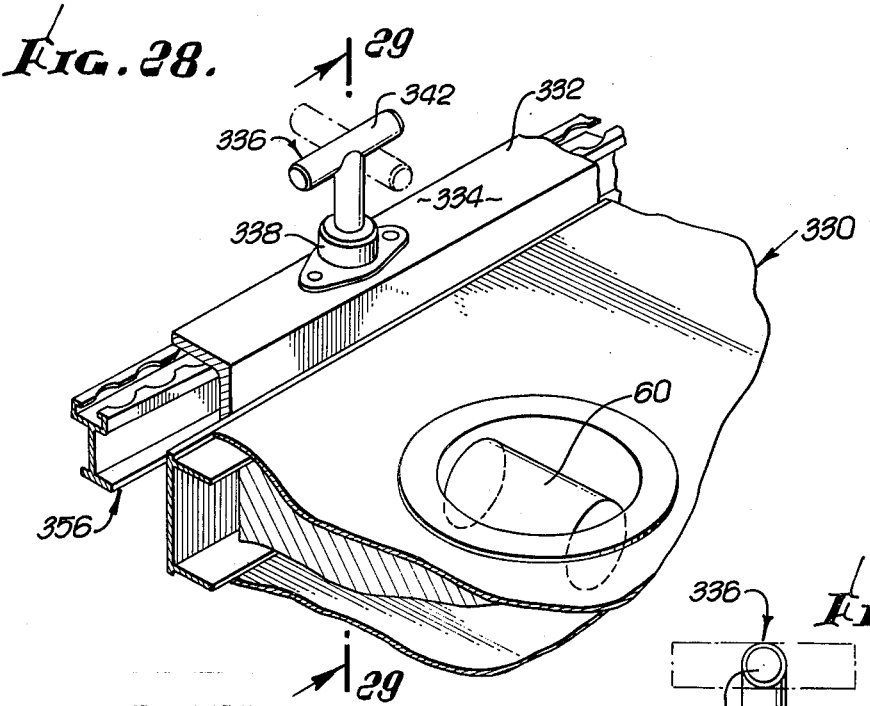
FIG. 28.
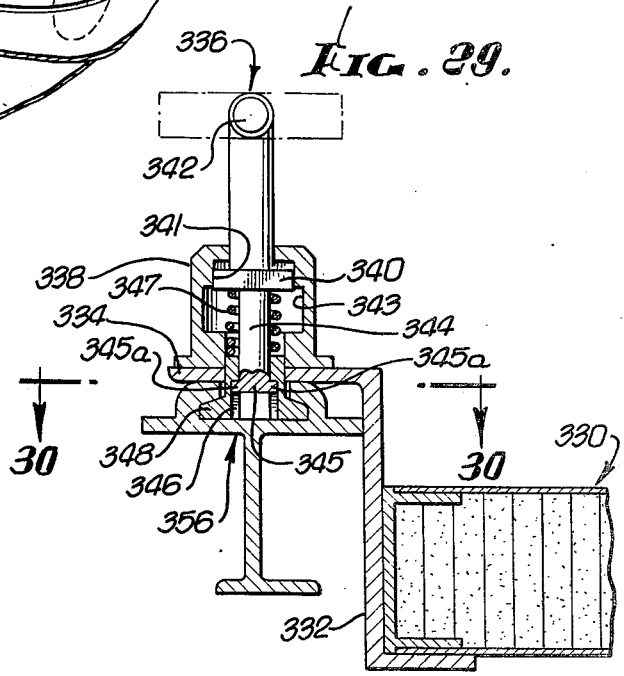
FIG. 29.
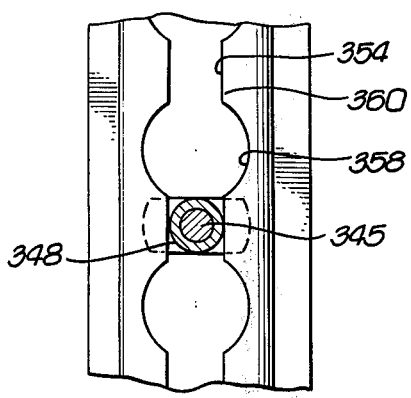
FIG. 30.
FIG. 31.

MODULAR SYSTEM FOR QUICK CONVERSION OF AIRCRAFT PASSENGER COMPARTMENTS TO CARGO BAGGAGE/COMPARTMENTS

BACKGROUND OF THE INVENTION

The invention relates to a modular system for quickly converting passenger aircraft, or parts thereof, into cargo carrying compartments. Prior art cargo and baggage systems for installation in aircraft are generally of three types, namely, freighter, convertible, and quick change. The conveyor and restraint means of these systems are comprised of many individual pieces, such as roller trays, guides, restraints and locks, which either bolt directly to the aircraft floor structure or plug into seat rail type of fittings that are provided in the aircraft system. This prior type of system, while intended for making a quick change from a passenger compartment to a cargo compartment, or vice versa, is relatively complicated because of the many separate parts.

In the present invention each of the components of the system are integral in a module sandwich panel having a honeycomb core for lightness, so as to be easily handled by one man. This modularized system provides very quick installation in converting from passenger compartments to freight compartments in aircraft.

SUMMARY OF THE INVENTION

The present invention meets a current need for quick convertibility to increase passenger and freight revenue. This is achieved by carrying freight in converted passenger compartments during slack passenger periods, such as, during the night and off-season. Whereas some of the present day convertible systems are available for compartment conversion, they have a relatively complicated system that requires considerable structural modification to adapt them to passenger aircraft. In contrast, the present invention requires no or minimum modification to existing passenger aircraft, and therefore offers tremendous operational advantages.

Accordingly, it is an object of the invention to provide a system for quickly converting aircraft passenger compartments into cargo or baggage carrying compartments and vice versa.

It is another object of the invention to provide a quick aircraft compartment conversion system, as described in the preceding paragraph, in which each modular floor forming panel is complete within itself and can be quickly connected to and quickly disconnected from standard aircraft floors.

It is still another object of the invention to provide a system, as described in the preceding paragraphs, for converting aircraft passenger compartments into freight compartments having floor forming panels which are installed without structural changes or additions to the aircraft.

It is a further object of the invention to provide a system, as described in the preceding paragraphs, in which each of the floor forming panels may contain an electric drive system for moving cargo thereover, the drive system being adapted to be integral within a panel having a height of 2 inches to 2½ inches.

It is a still further object of the invention to provide a system, as described in the preceding paragraphs, in which each of the floor forming panels may be secured to the aircraft with approximately four fittings per panel to take the tension loads.

It is another object of the invention to provide a system, as descried in the preceding paragraphs, in which floor forming panels may be easily stowed when not in use and are of a size to be handled by one man.

It is still another object of the invention to provide a system, as described in the preceding paragraphs, in which cargo restraint loads on the floor panels may be applied directly to the seat rails or through the panels to the seat rails.

It is a further object of the invention to provide a system, as described in the preceding paragraphs, having built-in guides and conveying means in the floor panels, the conveying means being manually operable or adaptable to be power driven.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 1 is a plan view of an aircraft passenger compartment illustrating the installation of a modular system by which the passenger compartment was quickly converted into a freight carrying compartment;

FIG. 2 is a fragmentary view of a modular threshold conveyor loading ramp, taken along the lines 2—2 of FIG. 1;

FIG. 3 is a fragmentary cross-sectional view, taken substantially along the lines 3—3 of FIG. 1;

FIG. 6 is a cross-sectional view, taken along the lines 6—6 of FIG. 4, illustrating a cargo conveying roller and a side guide and restraining means;

FIG. 7 is an end view of a cargo restraining stop and modular panel securing means, taken along the lines 7—7 of FIG. 4;

FIG. 8 is a side view, taken along the lines 8—8 of FIG. 7;

FIG. 9 is an end view of the system shown in FIG. 1 within an aircraft;

FIG. 10 is a plan view of the system shown in FIG. 1 with a cargo ramp at the rear end of the aircraft;

FIG. 12 is a fragmentary view, taken along the lines 12—12 of FIG. 11, illustrating a modular loading ramp;

FIG. 13 is a fragmentary cross-sectional view of the loading ramp, taken substantially along the lines 13—13 of FIG. 12;

FIG. 14 is a fragmentary cross-sectional view illustrating in detail that portion of the loading ramp within the circle 14 in FIG. 12;

FIG. 15 illustrates the detail within the circle 15 in FIG. 11 of a hinged connection of a portion of a loading panel of the modular system;

FIG. 16 is a fragmentary view, taken along the lines 16—16 of FIG. 15;

FIG. 17 is a view illustrating a combined guide and stop means, taken along the lines 17—17 of FIG. 11;

FIG. 18 is a view illustrating the combined guide and stop means in a retracted and operable position, taken along the lines 18—18 of FIG. 17;

FIG. 19 is a partially cross-sectional view illustrating an omnidirectional conveying unit in a loading panel, taken along the lines 19—19 of FIG. 11;

FIG. 20 is an end view of a guide rail on a loading ramp, taken along the lines 20—20 of FIG. 11;

FIG. 21 is a cross-sectional view illustrating a quick connect and disconnect means for securing the modular floor panels to seat rails, taken along the lines 21—21 of FIG. 11;

FIG. 22 is a cross-sectional end view of an edge-to-edge fitting of a bidirectional floor panel and a loading panel, taken along the lines 22—22 of FIG. 11;

FIG. 23 is a fragmentary partially cross-sectional view illustrating a fixed cargo guide and restraining rail and a cargo conveying roller in a modular bidirectional floor panel, taken along the lines 23—23 of FIG. 11;

FIG. 24 is a fragmentary end view, partially in cross section, taken along the lines 24—24 of FIG. 11, and illustrating a modular bidirectional floor panel having a cargo guiding and restraining side rail and quick disconnect means securing the panel to aircraft seat rails.

FIG. 25 is a fragmentary plan view of a seat rail taken along the lines 25—25 in FIG. 24;

FIG. 26 is a fragmentary partially cross-sectional view illustrating a rectractable cargo restraining spacer stop in its upright holding position, taken along the lines 26—26 of FIG. 11;

FIG. 27 is a side view of the cargo spacer stop, taken along the lines 27—27 of FIG. 26;

FIG. 28 is a fragmentary perspective view of a modular panel supported by and secured to a raised seat rail positioned at the side of the aircraft;

FIG. 29 is a cross-sectional view taken along the lines 29—29 in FIG. 28;

FIG. 30 is a plan view of the seat rail in FIG. 28, illustrating the panel in secured position;

FIG. 31 is a plan view of the seat rail in FIG. 30, illustrating the panel in the unsecured position;

DESCRIPTION OF THE PREFERRED EMBODIMENTS

Figure 4:
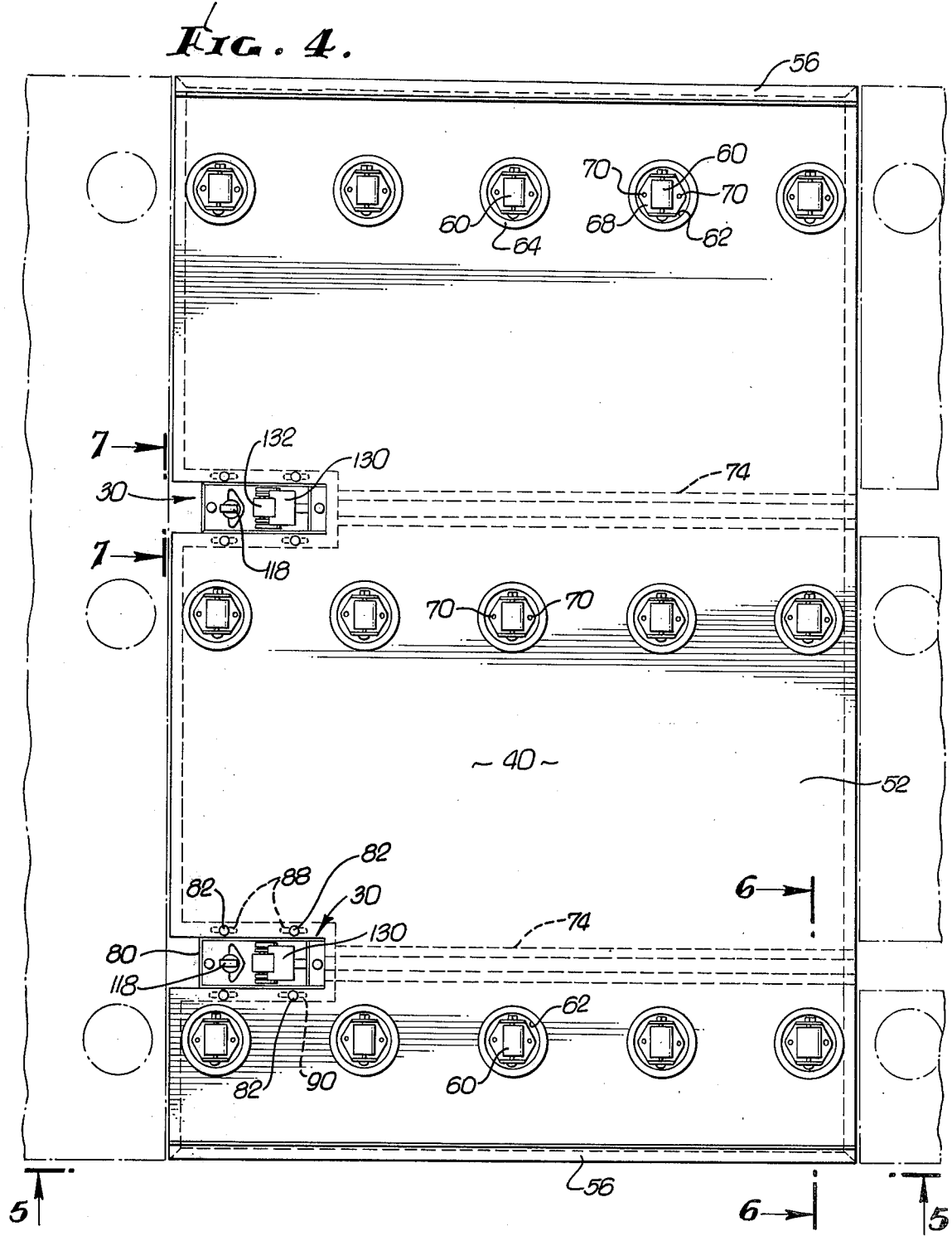
FIG. 4 is a plan view illustrating one modular floor panel of the system shown in FIG. 1.
Figure 5:
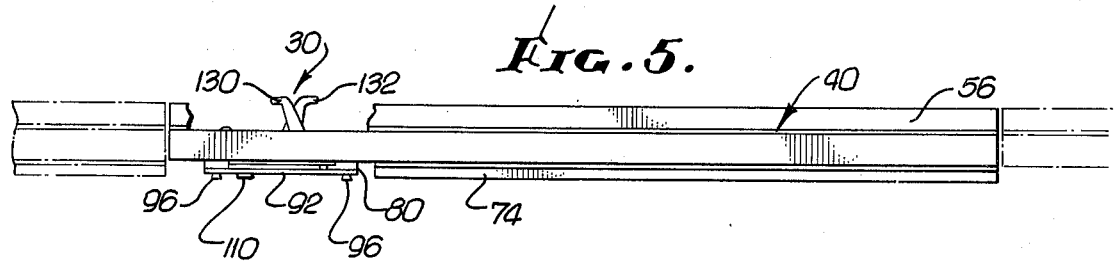
FIG. 5 is an end view taken substantially along the lines 5—5 of FIG. 4.

Referring again to the drawings, there is shown in FIGS. 1-9 a modular system according to the invention, installed in a relatively small commercial aircraft, and in which the entire passenger compartment has been converted into a cargo carrying compartment. The outline of the aircraft is not shown, except in part in FIGS. 2 and 9.

The aircraft, generally designated as 10, has a forward side door opening 12 at which a threshold conveyor or loading ramp 14 is horizontally positioned externally of the aircraft and may interface with external loading platform, not shown. The loading ramp is formed as a panel having sill rollers 16. It is hinged at 15 and may be supported by linkage ties 17 attached to the aircraft so as to be able to receive loads from fork lifts and truck beds, for example. Inwardly of the rollers are omnidirectional ball conveyors 18 in multiple rows on which a cargo container, such as 20, shown in phantom outline in FIGS. 2 and 3, is movable into the aircraft. At the ends of the ramp are guide rails 22 for guiding the cargo containers passing over the ramp and for restricting their lateral movement.

As shown in FIGS. 1 and 3, the loading ramp is secured to omnidirectional entrance panels 26 and 28 by means of hinges 15 which permit the ramp to be raised, as shown in FIG. 3 in phantom outline, for securing within the aircraft when the door is closed.

The ball omnidirectional conveying means 18 spaced throughout the entrance panels and loading ramp are shown in detail in FIG. 19 and in U.S. Pat. No. 3,709,450. Each ball is maintained within a cup 19 having an upper annular flange 21 supported on the upper surface of a panel. Within the cup is a spring container 23, having a coil spring 25 therein, supporting an inner semispherical cup 27 in which the ball 18 is rotatable on ball bearings 29. The ball is held within the cup by a retainer 31 having an upper opening through which part of the ball extends. The retainer 31 is restricted against excessive upward movement by flanges 33 on the spring container 23.

The entrance or loading panel 26 is relatively short in the fore and aft direction and is made of a particular size to fit the aircraft in question. The panel 26 has two retractable combined lock, stop and spacing members 30 to restrain the cargo against movement in the fore, aft and up directions, there being none in the panel 28 because of the specific arrangement. The panel 26 has a guide rail 32 to limit the forward movement of the cargo containers as they are being moved athwartship into the aircraft. Forwardly of the panel 26, and secured thereto, is a non-conveying panel 34, providing flooring for cargo handlers pushing the cargo rearwardly. Rearwardly of the omnidirectional panels are a series of bidirectional conveying panels 40, 42, 44 and 46. The panels are generally rectangular so as to be complementary to a particular aircraft, and are positioned in spaced edge-to-edge relationship in the fore and aft direction.

As shown in FIGS. 3–8, each of the bidirectional panels, as 40, has an internal honeycomb structure 50 spaced between upper and lower plates 52 and 54, respectively, and has two vertical side rails 56. Each of the panels has three rows of spaced rollers 60 mounted within cups 62 recessed in the panels. The cups are generally cylindrical, having annular flanges 64 supported on the upper faces 52 of the panels. The rollers are mounted on easily removable pins 66 supported in a U-shaped member 68. Each of the roller cups is secured to the panel by means of two bolts 70 which are easily securable and easily removable.

The panels, as 40, have supporting channel-shaped stiffening members 74 depending therefrom, extending longitudinally from stops 30 at one end of the panel to the other end, and are positioned on aircraft seat rails 76 and 78, shown in outline in FIG. 1, from which the seats have been removed. A seat rail 76 is shown in end view in FIG. 7 and is shown in plan view in FIG. 25. The seat rails are secured to the aircraft floor structure. They have a longitudinally extending flange or base member 75 and extending upwardly therefrom is a generally channel-shaped portion 77 having alternate slot-shaped and enlarged generally circular openings 79 and 81, respectively.

Shown in FIGS. 4, 5, 7 and 8, the cargo restraining stops 30 are recessed in rectangular frame members 80, secured to the panels by bolts 82 which extend through adjusting slots 88 and 90 in lower side plates 84 and 86 extending laterally from the frame members. Depending from the frames at their fore and aft ends through a stiffening plate 92, and extending below the panels, are locking anchor bolts 94 for engaging the seat rails. The bolts have round heads 96 adapted to fit downwardly into generally circular openings, as 81, in FIG. 25, and then be moved forwardly or rearwardly into the slot areas 79 of the seat rail to hold the panel in tension to the aircraft floor.

Also depending from each frame 80 is a cylindrical, locking shear plunger 110 having a slotted pin 112 at its upper end secured by a pivot pin 114 to a locking member 116 having a handle 118. The member 116 has cam surfaces 120 and 122 movable on a fixed member 124 supported on an inverted U-shaped frame 126 to raise and lower the plunger. The pin 112 extends through the member 124 and the upper wall of the member 126. Surrounding the pin 112 within the member 126 is a coil spring 128 biasing the plunger downwardly and aiding in maintaining the cam surface 120 in its shown locking position. The plunger is positioned by action of the handle 118, which when lifted raises the plunger to its raised unlocked position, the cam surface 122 being moved into contact with the member 124. In its locked position each plunger is inserted in a circular opening 81 in a seat rail to lock the panel in shear.

The stops 30 having two container restraining retractable members 130 and 132, each adapted to extend over a peripheral rail 131 and/or into a peripheral slot 133 of a typical container 20. These stops are disclosed in U.S. Pat. No. 3,796,397. In FIG. 8 the members 130 and 132 are shown in their upright positions, being locked by spring biased member 134, and are shown in phantom outline in their retracted positions. Rearward end stops 136, shown in FIG. 1, have one retractable member which is movable from the retractable position to the vertical position.

When the panels are positioned to be secured on the aircraft floor, the supports 74 rest on the seat rails 76 and 78. Because of the spacing of the tension load carrying anchor bolts 94, four in each panel, their heads 96 are positioned to be within ½ inch of the circular openings 81 in the seat rail, shown in FIG. 25. The bolts 82 in the slots 88 and 90 provide a slidable adjusting float arrangement by which the frames 80 can be moved, relative to the panels, forwardly or rearwardly ½ inch or less, as necessary, to move the heads 96 into the circular openings in the seat rails. Then the frame is moved again to move the bolts 84 into the slotted area 79 to lock the panels in tension to the aircraft floor. When the bolts are in the slotted area, each shear plunger 110 is in position to be moved downwardly into a circular opening 81 to lock the panels in shear. This is accomplished by moving the handle into the down position, as shown in FIG. 8.

The foregoing arrangement provides for a quick and easy method of installation. The float incorporated in the frames 80 enables them to take up seat rail tolerance deviations, and the panel is easily positioned without any awkward maneuvering thereof, the shear plunger holding the panels against side, forward and aft movements. In this system the anchor bolts 94, the shear plungers 110, the container locking members 130, 132 are integral with the frames 80 and the panels, and the container and panel shear and restraint loads are reacted directly into the seat rails.

In the loading operation, the cargo is moved onto the ramp 14 and then onto the entrance panels 26 and 28. Without turning the containers, they are moved rearwardly to abut the end stop 136, the remaining containers being held in place, against fore, aft, up and downward movement, by the various locking members 130 and 132 and against awthwartship movement by the side rails 56.

In FIG. 10 the same arrangement is shown as in FIG. 1, except that the loading ramp 14 is positioned at a rear door of the aircraft and there are no loading panels 26 and 28 in that all of the movement of the cargo is in the fore and aft direction.

In FIGS. 11–27, another embodiment of the invention is shown. Here in FIG. 11 a modular system according to the invention is installed in a part of a passenger compartment of a large aircraft, which part has been converted by the system for carrying cargo. In this embodiment, the cargo restraint loads are reacted through the floor forming panels into the seat rails. The aircraft compartment is defined by the boundaries designated as 140, 142, 144, and 146, and having a door opening 148 for receiving cargo. The broken line 150 is the center line of the aircraft extending in the fore and aft directions, the area 152 being a center aisle for passengers. Secured within the aircraft are seat rails 154, 156, 158, 160 and 162, the seats having been removed.

Figure 11:
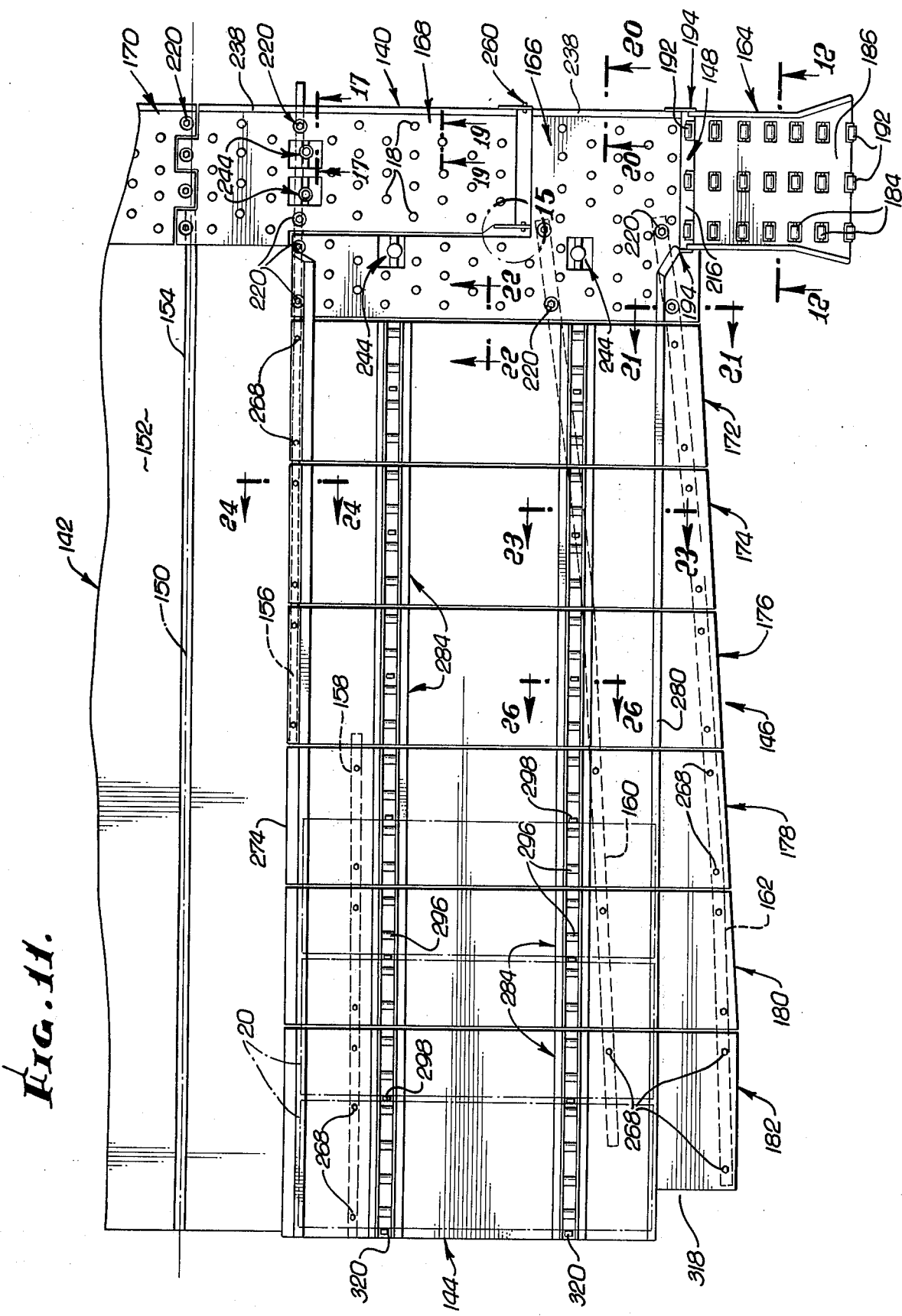
FIG. 11 is a fragmentary plan view of a converted passenger compartment illustrating another embodiment of the invention.

As shown in FIG. 11, at the rearward end of the compartment, adjacent the boundary 140, extending outwardly of the aircraft is a threshold conveyor or loading ramp 164, and inwardly of the door opening 148 are omnidirectional cargo conveying, floor forming entrance or loading panels 166, 168, and 170, having multiple omnidirectional cargo conveying balls 18.

Forwardly of the loading panels are cargo conveying, floor forming, bidirectional or roller containing panels 172, 174, 176, 178, 180 and 182, each of which has a generally trapezoidal configuration so as to be complementary to a particular aircraft. The bidirectional and omnidirectional panels are positioned in an edge-to-edge relationship in the fore and aft direction.

Considering the various modular elements of the system in detail, the threshold conveyor ramp 164 extends generally horizontally outwardly of the aircraft, having a plurality of rollers 184 extending above an upper face 186 of the ramp to receive the bottom surface of a cargo container 20, shown in phantom outline in FIGS. 11-14. As shown in FIG. 13, the rollers 184 are supported on axles 190 internally of the panel framework, arranged to convey cargo bidirectionally into and out of the aircraft. At the outer end of the ramp 164, are sill rollers 192, spaced from a supporting loading surface externally of the aircraft. The inner end also has rollers 192 spaced from the aircraft floor.

As shown in FIGS. 12-14, the ramp 164 is hinged at 194 to the omnidirectional or loading panel 166 just inside of the aircraft, inwardly of the aircraft door threshold 196 in phantom outline in FIG. 13. Conventional quick release pins 198 provide the hinge pin for the connection. These pins are of the type in which a button, as 200, is pushed inwardly to radially withdraw detents 202 to permit the easy removal or insertion of the pin.

In FIG. 13, the loading ramp rollers 184 support the cargo 20 over the aircraft threshold 196. The ramp upper face 186 is supported by brackets, as 204 and 206, as best seen in FIG. 14, extending between the upper face 186 and a lower face 208. Supporting the lower face at spaced intervals are channel-shaped, strengthening brackets 210, provided to space the loading ramp from the aircraft door threshold 196. On the left in FIG. 13 the loading ramp is shown to be supported by an outside loading structure 212.

Along the upper, outer edges of the loading ramp 164 are inwardly opening U-shaped guide rails 214. In FIGS. 13 and 14, the cargo containers are shown to have rails 131 and slots 133, around their lower peripheries, complementay to the channel-shaped guides 214 for fitting therewith, holding and guiding the cargo in the proper moving direction on the ramp. Prior to closing the aircraft door after the cargo has been loaded, the ramp is raised on its hinges 198 and positioned in an in-flight vertical position within the aircraft. As shown in FIG. 11, there is a space 216 extending between the loading ramp 164 and the loading panel 166 with the rollers 192 extending into the space to permit the easy movement from the ramp to the panel 166. As shown in FIG. 14, the panel 166 supports the hinges 198 and is flush with the upper surface 186 of the ramp.

Referring now to FIGS. 11 and 15–22, the loading panels 166, 168 and 170 are formed of upper and lower metal faces with a honeycomb structure 218 therebetween provided to make very lightweight and high strength individual panels. Each of the panels is secured in tension by a plurality of anchor bolts 220 to the seat rails in the aircraft floor, shown in detail in FIG. 21. The rails, as 162, are of the same general types shown in FIG. 25 in plan view. Before the panels are inserted, the round anchor heads 222 of the bolts are inserted into the rails through the circular openings, as 81, and then are moved into the slots, as 79, to hold the bolts within the rails. As shown in FIG. 21, in phantom outline, the aircraft floor 224 extends over rail flanges 226 and its upper surface is flush with the top of the rails. The loading panels are supported above the aircraft floor and are spaced therefrom by a washer 226 and a spacer 228 on the bolts. The lower surface of the panel 166 abuts the upper surfaces of the spacer 228 and within the panel is a sleeve 230 surrounding the bolt. The upper end of the bolt extends into a recess 232 and a metal support plate 234 is positioned between the nut 236 and the upper panel surface in the recess.

In FIGS. 11 and 20, a U-shaped side guide rail 238 is shown extending along the rear portion of the compartment at the boundary 140. This rail prevents the movement of cargo to the rear of the boundary 140 and also guides the cargo as it is moved athwartship or transversely on the loading panels. The rail 238 is secured to the edge of the panel by bolts which also secure a channel-shaped support 240 on the panel, supporting the panel above the aircraft floor the same distance as the panel is supported on the seat rail, shown in FIG. 21.

In FIGS. 11, 17 and 18 there are shown retractable guide and stop members 244; two are shown in panel 166 and two are shown in panel 168. At the upper end of the guide-stop 244 there is a roller 246 which permits easy moving of the cargo containers on it. The guide-stops are supported in a recess 248 in the loading panels in a cup 250 secured on the bottom of the panel. Each guide-stop is supported on a bolt 252 on which it is pivotal from an upright position to a retracted position, as shown in FIG. 18 in phantom outline. A stop member 258, shown in FIG. 18, prevents movement of the guide-stop to the left.

In FIGS. 11, 15 and 16, hinge connections 260 between the panels 166 and 168 are shown having a quick release hinge pin 198. In flight, on the type of aircraft shown, the panels 168 and 170 are frequently required to be in a vertically secured position to permit passenger access on the aircraft floor under these two panels. Hence, the hinges, so that the panels 168 and 170 can be raised when the anchor bolts 220 are removed after all the cargo is loaded.

In FIG. 22 the edge-to-edge relationship between the loading panel 166 and panel 172 is illustrated. As indicated at the door threshold, the loading panels must be supported to fit thereover, and in contrast the other panels forwardly of the loading panels are supported closer to the aircraft floor. Because of this height difference, a step guard 262 is required for safety and for easy movement of the cargo containers from and to the panels 172 and 166.

As shown in FIGS. 11 and 24, each of the panels 172, 174, 176, 178, 180 and 182 are secured to the seat rails 156, 158, 160 and 162 by means of locking anchor bolts 268. Approximately four bolts are used to secure each panel to the aircraft floor to carry the tension and restraint loads. In FIG. 24, there is a vertical extending bracket 270, shown in phantom outline, supporting a center aisle side wall 272, fitted around the panels and cargo to close off the cargo compartment from the passenger areas, as aisle 152. On each of the panels, as 174, along the center aisle, there is an I-beam guide rail 274 into which a cargo rail 131 may extend and be held against athwartship movement as it is moved into position and during flight. The guide rails 274 are secured to the panels by means of a plurality of bolts 278.

On the other edge of the panels, as 174, as shown in FIGS. 11 and 23, there is an inwardly opening channel-shaped guide rail 280 secured to the individual panels by a plurality of bolts 278. The rails 274 and 280 define the athwartship boundaries of the cargo supporting area and restrain upward movement of the cargo.

As shown in FIGS. 11 and 23, each panel has, secured therein, a pair of spaced, parallel, channel-shaped roller trays 284 extending in the fore and aft direction, having a substantial portion of the channel recessed in the honeycomb panels. Each tray has a pair of horizontal side flanges 286 and 288 to provide additional support and a pair of vertical channel sides 290 and 292 supporting on pins 294, having parallel axes, a plurality of cargo supporting rollers 296. The pins 294 may be positioned in various spaced locations through openings in the sides 290 and 292 to provide for changing locations of the rollers. Because the roller panels, as 174, are lower than the loading panels, the rollers extend higher above the panel surface than do the balls. To provide additional support for the roller trays, the honeycomb structure under the trays and flanges may be potted.

To hold the cargo containers 188 in place in the fore and aft directions, as shown in FIGS. 11, 26 and 27, retractable, restraint or spacer stop means 298, having an upper leg 300 and a lower leg 302, are secured within the roller trays 284 by pivot pins 304 and locking pins 306 at intervals, as needed, in accordance with the size and positioning of the cargo containers. As shown in FIG. 27, there are a plurality of holes 308 and 310 in roller trays to receive a locking pin 306 and a pivot pin 304, respectively. The pivot pin is secured within a stop supporting channel-shaped member 312 which is movable fore and aft within the trays for adjustment, and the locking pin extends through the same type of openings in the roller trays that support the roller pins. The pins 306 are of the quick release type, and when they are removed the spacer stops 298 may be moved into the retracted position shown in FIG. 27, and the pin may be inserted into another of the holes 308 in the roller trays to lock the stop in the retracted position.

As shown in FIG. 11, the panel 182 is varied in shape from the other panels, having a rectangular cutaway portion 318 adapted for the particular aircraft. Also for the particular aircraft, the guide rails 280 on each of the panels are spaced inwardly from the outer edges thereof to provide a space between the aircraft boundary 146 and the cargo. At the forward end of the aircraft, at the boundary 144 permanent vertical stop members 320 are positioned to restrain the cargo from moving forwardly thereof.

To convert the aircraft passenger space to a cargo carrying compartment, the seats are removed from the tracks in the aircraft and each roller panel, as 182, is installed separately by first inserting the anchor bolts 268 into the rails through the enlarged openings 81, shown in FIG. 25, and when the panels are inserted onto the bolts, or vice versa, the bolts are moved into the slot portions 79, and tightened on the panel so that the bolts cannot be removed and the panels are held securely in place. The same is accomplished with respect to the anchor bolts 220 for the loading panels 166, 168 and 170. The threshold ramp 164 is then hingedly secured to the loading panel 166. Because all of the various elements are integral within the individual panels the converting operation is a very quick and easy one.

The cargo, typically in standard containers having rails 131 and slots 133 along their lower peripheries, is moved inwardly onto the loading panels supported by omnidirectional conveying balls 18. During the loading, the guide-stops 244 in the panel 166 are in their retracted position and the guide-stops in the panel 168 are in their upright position to prevent further athwartship movement of the cargo when it is going to be moved forwardly into the area shown in FIG. 11. After the containers have been positioned so as to be in alignment with the guide rails 274 and 280, they are moved forwardly to positions as shown, with the spacer stops 298 in their upright positions located to restrain adjacent containers.

After the loading has been completed, if the cargo containers extend as far aft as the guide-stops 244 in loading panel 166, the guide-stops may be raised to their upright position to prevent the cargo from moving rearwardly. In the particular aircraft for which the system shown has been created, it is probable that passengers would have to walk from compartments other than those shown to a location rearwardly of the loading panels 168 and 170. To provide the passengers with a safe walking floor, the panels 168 and 170 are disconnected from the rails 154 and 156 and are raised on their hinges, as at 260, to an in-flight secured position. The threshold ramp 164 is also raised on its hinges to an in-flight position and secured adjacent the closed doorway. The specific system shown accommodates cargo containers having a width of 30 inches, a length of 61 inches, and a maximum height of 64 inches.

An electrically driven system could readily be installed in each of the floor panels with the installation of a small motor connected to selected rollers by means of chains or belts, or in some cases by direct drive whereby in certain installations, for example, only two axially aligned rollers in each panel would be power driven.

In FIGS. 28-31 another embodiment of the invention is shown. Here, the panels, generally designated as 330, are similar to the panel 40 in FIG. 4 having a plurality of rollers 60 in rows. The panel at each athwartship edge has a bracket 332 extending longitudinally, the lower parts of the bracket being secured to the panel. At its upper end the bracket has a laterally outwardly extending flange 334 adapted to rest on outboard seat rails 356 which are above the aircraft floor level, the control portion of the panel resting on seat rails flush with aircraft floor. A plurality of quick release vertical restraint anchor bolts or studs, generally designated as 336, are mounted on the flanges 334 in cylindrical housings 338. The studs have handles 342 having rectangular blocks 340 at the lower ends and which, as shown in FIG. 29, fit within a rectangular lip opening 341 at the top of a cylinder 343. Extending downwardly from the block 340 is a reduced diameter portion 344 of the stud, having an end 345, terminating in a pair of opposed keys 345a, which in turn are positioned within a slot 346 of a T-bar shaped locking key 348. Around the stud portion 344 is a coil spring 347 abutting the underside of the block 340 and the locking key 348 within the cylindrical housing.

As shown in FIG. 29, the stud, including the keys 345a, is adapted to slide up and down within the locking key 346, and the keys 345a fitting within the slot 346 will cause the locking key 348 to rotate when the handle 342 is turned. The key 348 is adapted to lock the panel to the seat rail 356, having alternate slot and circular openings 354 and 358, respectively. When the flange 334 comes to rest on the seat rail 356, the key being in its disengaged position, as shown in FIG. 31, it fits longitudinally into a slotted opening 354. By moving the handle downwardly, the block 340 moves out of the rectangular lip 341 against the force of the spring and into the cylinder 343, the key being lowered below the underside of slot-forming parts 360 of the rail. The handle 342 is then rotated 90° into its locked position, as shown in FIG. 30, where it is held securely in place against rotation by the force of the spring 347 acting on the block 340 within the lip 341. This type of stud is adapted for very quick connection and takes the tension loads, holding the panel in place.

Figure 34:
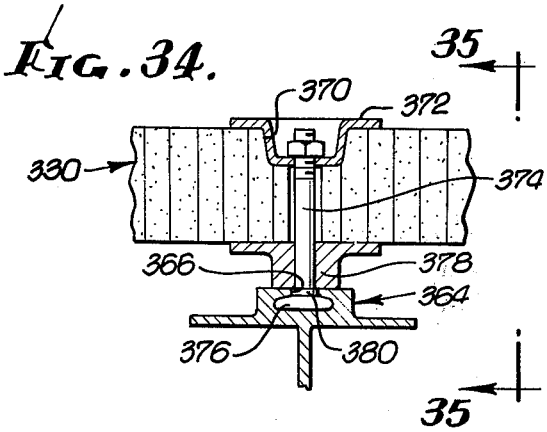
FIG. 34 is a fragmentary cross-sectional view of a panel held in tension by an anchor bolt in a seat rail.
Figure 35:
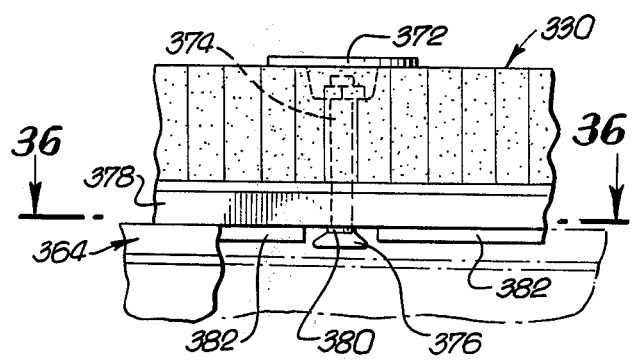
FIG. 35 is a view taken along the lines 35—35 in FIG. 34.
Figure 36:
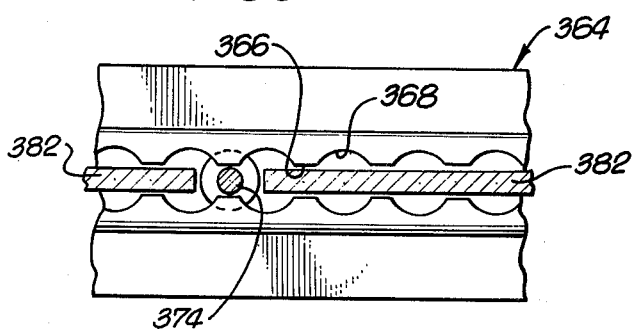
FIG. 36 is a view taken along the lines 36—36 in FIG. 35.

The shear loads may be taken by lugs in the base of the panel, shown in FIGS. 34-36, where seat rails 364, inwardly of the rails 356, are flush with the floor. The seat rails 364 have alternate slotted openings 366 and circular openings 368.

The panel 330 has a plurality of recesses, as 370, in which brackets 372 are fitted and through which locking anchor bolts or studs 374 extend downwardly, having at their lower ends circular heads 376. In abutment with the lower face of the panel are shear lug supporting members 378 held in place by a plurality of studs 374 having intermediate diameter portions 380 in holding abutment with the members 378. Extending downwardly from the members 378 are elongated shear lugs 382 adapted to fit into the slotted portions 366 of the rails to take the shear loads of the panels to prevent athwartship movements. The studs 374 take tension loads when the round heads 376 are moved longitudinally out of the circular openings and under the metal forming the slots.

Figure 32:
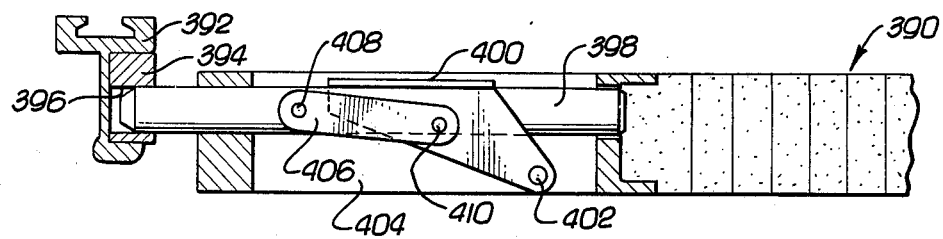
FIG. 32 is a fragmentary side view of a modular panel, illustrating pin means extending from the side of the panel and securing the panel to the aircraft.
Figure 33:
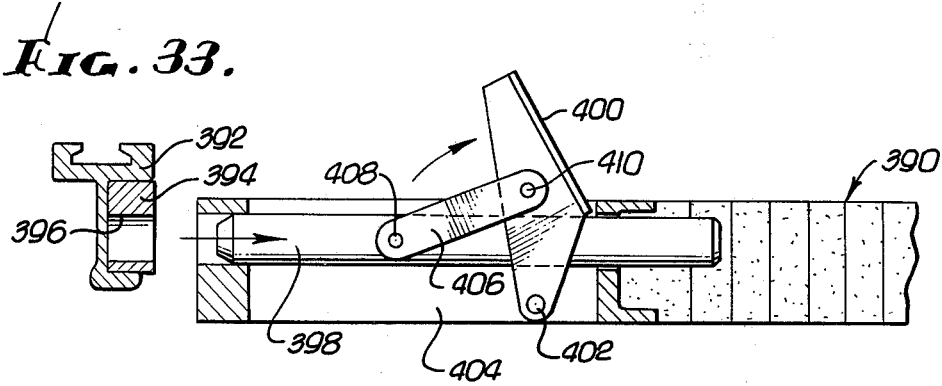
FIG. 33 is a view of the panel in FIG. 32 showing the pin means in the withdrawn position.

In FIGS. 32 and 33, another embodiment of the invention is shown. This embodiment is usable in aircraft having outboard, raised seat rails, as shown in FIG. 8, or may be used where aircraft structural members may be positioned at the sides to receive pins extending laterally outwardly from panels. In FIGS. 32 and 33, there is a panel, generally designated as 390, resting on centrally positioned seat rails, not shown, flush with the aircraft floor surface. Extending laterally outwardly of the panel are raised seat rails 392 having longitudinally extending bars 394 secured to the rail structure, each bar having a plurality of longitudinally spaced cylindrical openings 396 therein.

In the panel extending in athwartship directions out of both sides thereof are pins 398 adapted for athwartship movement. The pin is operated by an up-and-over center linkage arrangement having a handle 400 pivotally secured at one end by pin 402 within a recess 404 in the panel. A link 406 is pivotally secured to the pin 398 at 408 and is pivotally secured at 410 centrally in the handle member. When the handle is moved downwardly, the linkage causes the pin to move outwardly into the openings 396, and when the handle is lifted the linkage causes the pin to be withdrawn from the openings 396 and to a position within the panel. The pin is locked through the linkage arrangement when the handle is in the down position in FIG. 32, that is the pivot 410 of link 406 will be below the pivot 408 or vertically offset therefrom.

This embodiment provides a very high speed connecting and disconnecting modular panel arrangement whereby the panel is merely positioned on the aircraft floor in proper alignment and then secured therein by operating a plurality of handles 400 on both sides to move the pins 398 into the openings 396. The restraint and conveying loads are carried by the panel to the chosen interface points where the loads are transferred by the pins to the aircraft structure. Studs may be used to secure the panel to the central seat rails, if necessary. The stops 30, FIGS. 7 and 8, may be used in this embodiment without the bolts 96, the float arrangement in the frames 80, and the shear plungers 110.

The invention and its attendant advantages will be understood from the foregoing description and it will be apparent that various changes may be made in the form, construction and arrangement of the parts of the invention without departing from the spirit and scope thereof or sacrificing its material advantages, the arrangements hereinbefore described being merely by way of examples, and I do not wish to be restricted to the specific forms shown or uses mentioned except as defined in the accompanying claims, wherein various portions have been separated for clarity of reading and not for emphasis.

I claim:

1. A panel for use in a quickly convertible modularized system for securing cargo in passenger compartments of aircraft, said panel comprising:
   an elongated flat floor member having an upper side providing a floor surface and a lower side to face an aircraft floor,
   quick connect and disconnect fittings in said floor member for engagement with aircraft fittings to secure said floor member to said aircraft,
   cargo container stops in said floor member to hold cargo containers in place,
   conveying means on said floor member for providing easy movement of cargo containers thereon,
   guide means on said floor member for guiding cargo containers into place and for holding said containers in place, and
   said quick fittings depend from frames supporting said stops, and include shear plungers for engaging said aircraft fittings and supporting said floor member in shear with respect to said aircraft.

2. The invention according to claim 1 in which:
   said frames are slidably adjustable in said floor member to permit easy engaging of said quick fittings with said aircraft fittings.

3. The invention according to claim 2 in which:
   said shear plungers, when engaged in said aircraft fittings, lock said frames against movement along said aircraft fittings.

4. The invention according to claim 3 in which:
   restraint and tension loads of cargo on said floor member are reacted directly into said aircraft fittings.

5. The invention according to claim 3 in which:
   said aircraft fittings are seat rails,
   said frames are spaced from each other athwartship adjacent one end of said floor member,
   support members depending from said floor member and extending longitudinally fore and aft from adjacent said frames to adjacent the other end of said floor member,
   said support members being adapted to rest on said rails.

6. The invention according to claim 2 in which:
   said stops extend upwardly from said frames and from said floor member in a cargo holding position and are retractable into said frames below the level of the upper side of the floor member.

7. The invention according to claim 1 in which:
   said aircraft fittings are seat rails,
   said quick fittings have a handle extending upwardly of the upper side of the floor member,
   a stud extending downwardly from the handle and having a key at its lower end adapted to fit into one of said seat rails in an unlocked position,
   said handle being biased upwardly and being adapted to be rotated when forced against the bias downwardly to lock said key in said one rail.

8. The invention according to claim 1 in which:
   said quick fittings are pins secured to said floor member and are adapted to extend beyond edges of said floor member to engage said aircraft fittings,
   means on said floor member to extend said pins beyond said edges and to retract said pins within said edges,
   said last-mentioned means including linkage lock means for locking said pins in the extending positions.

9. The invention according to claim 1 in which:
   said conveying means are a plurality of rollers having parallel axes,
   said rollers being mounted in cups fitted in said floor member integral therewith generally below said floor surface, said rollers extending upwardly of said floor surface to engage cargo containers.

10. The invention according to claim 1 in which:
said conveying means are a plurality of bearing and spring supported balls,
said balls being mounted and fitted in said floor member generally below said floor surface,
said balls extending upwardly of said floor surface to engage cargo containers.

11. The invention according to claim 6 in which:
said stops are securable in said frames in a plurality of locations for positioning with respect to the cargo container sizes.

12. A panel for use in a quickly convertible modularized system for securing cargo in passenger compartments of aircraft, said panel comprising;
an elongated flat floor member having an upper side providing a floor surface and a lower side to face an aircraft floor,
quick connect and disconnect fittings in said floor member for engagement with aircraft fittings to secure said floor member to said aircraft,
cargo container stops in said floor member to hold cargo containers in place,
conveying means on said floor member for providing easy movement of cargo containers thereon, and
said aircraft fittings are seat rails,
said quick fittings have a handle extending upwardly of the upper side of the floor member,
a stud extending downwardly from the handle and having a key at its lower end adapted to fit into one of said seat rails in an unlocked position,
said handle being biased upwardly and being adapted to be rotated when forced against the bias downwardly to lock said key in said one rail.

13. A panel for use in a quickly convertible modularized system for securing cargo in passenger compartments of aircraft, said panel comprising:
an elongated flat floor member having an upper side providing a floor surface and a lower side to face an aircraft floor,
quick connect and disconnect fittings in said floor member for engagement with aircraft fittings to secure said floor member to said aircraft,
cargo container stops in said floor member to hold cargo containers in place,
conveying means on said floor member for providing easy movement of cargo containers thereon, and
said quick fittings are pins secured to said floor member and are adapted to extend beyond edges of said floor member to engage said aircraft fittings,
means on said floor member to extend said pins beyond said edges and to retract said pins within said edges.
said last mentioned means including linkage lock means for locking said pins in the extending positions.

14. A modular system for quickly converting aircraft passenger compartments into cargo compartments, said system comprising:
a plurality of aircraft floor forming panels, each panel having an upper face providing a floor surface and a lower face to be adjacent an aircraft floor,
quick connect and disconnect fittings in said panels for engagement with aircraft fittings to secure said panels to said aircraft, said panels being securable in adjacent edge-to-edge relationship,
cargo container stops on said panels to hold cargo containers on said panels against fore and aft movement.
conveying means in said panels for providing easy movement of cargo containers thereon from panel to panel, and
said quick fittings depend from frames supporting said stops, and include shear plungers for engaging said aircraft fittings and for supporting said panels in shear with respect to said aircraft.

15. The invention according to claim 14 in which:
said frames are slidably adjustable in said panels to permit easy engaging of said quick fittings with said aircraft fittings.

16. The invention according to claim 15 in which:
said shear plungers, when engaged in said aircraft fittings, lock said frames against movement along said aircraft fittings.

17. The invention according to claim 15 in which:
restraint and tension loads of cargo on said panels are reacted directly into said aircraft fittings.

18. The invention according to claim 16 in which:
said aircraft fittings are seat rails,
said frames are spaced from each other athwartship adjacent one end of said panels, and
support members depending from said panels and extending longitudinally fore and aft from adjacent said frames to adjacent the other end of said panels,
said support members being adapted to rest on said rails.

19. The invention according to claim 18 in which:
said stops extend upwardly from said frames and from said panels in a cargo holding position and are retractable into said frames below the level of the upper faces of the panels.

20. The invention according to claim 14 in which:
said aircraft fittings are seat rails,
said quick fittings have handles extending upwardly of the upper faces of the panels,
a stud extending downwardly from each handle and having a key at its lower end adapted to fit into one of said seat rails in an unlocked position,
each handle being biased upwardly and being adapted to be rotated when forced against the bias downwardly to lock said key in said one rail.

21. The invention according to claim 14 in which:
said quick fittings are pins secured to said panels and are adapted to extend beyond edges of said panels to engage said aircraft fittings,
means on said panels to extend said pins beyond said edges and to retract said pins within said edges,
said last-mentioned means including linkage locking means for locking said pins in the extending positions.

22. The invention according to claim 14 in which:
said conveying means are a plurality of rollers having parallel axes,
said rollers being mounted in cups fitted in said panels integral therewith generally below said floor surface,
said rollers extending upwardly of said floor surface to engage and support cargo containers for easy movement thereon.

23. The invention according to claim 14 in which:
said conveying means are a plurality of bearing and spring supported balls, said balls being mounted and fitted in said panels generally below said floor surface, said balls extending upwardly of said floor surface to engage and support cargo containers for easy movement thereon.

24. The invention according to claim 14 including:

a threshold ramp having a hinge connection to one of said panels forming an entrance panel at a door opening, said ramp extending in a loading position from the door opening to a surface exterior the aircraft, said ramp being adapted to be raised from the loading position on said hinge connection to an in-flight position within the aircraft, and roller conveying means on said ramp for engaging cargo containers thereon for easy movement into the aircraft.

25. The invention according to claim 14 in which:

said stops are securable in trays in a plurality of locations for positioning with respect to the cargo container sizes.

26. A modular system for quickly converting aircraft passenger compartments into cargo compartments, said system comprising:

a plurality of aircraft floor forming panels, each panel having an upper face providing a floor surface and a lower face to be adjacent an aircraft floor, quick connect and disconnect fittings in said panels for engagement with aircraft fittings to secure said panels to said aircraft, said panels being securable in adjacent edge-to-edge relationship, cargo container stops on said panels to hold cargo containers on said panels against fore and aft movement, conveying means in said panels for providing easy movement of cargo containers thereon from panel to panel, and said aircraft fittings are seat rails, said quick fittings have handles extending upwardly of the upper faces of the panels, a stud extending downwardly from each handle and having a key at its lower end adapted to fit into one of said seat rails in an unlocked position, each handle being biased upwardly and being adapted to be rotated when forced against the bias downwardly to lock said key in said one rail.

27. A modular system for quickly converting aircraft passenger compartments into cargo compartments, said system comprising:

a plurality of aircraft floor forming panels, each panel having an upper face providing a floor surface and a lower face to be adjacent an aircraft floor, quick connect and disconnect fittings in said panels for engagement with aircraft fittings to secure said panels to said aircraft, said panels being securable in adjacent edge-to-edge relationship, cargo container stops on said panels to hold cargo containers on said panels against fore and aft movement, conveying means in said panels for providing easy movement of cargo containers thereon from panel to panel, and said quick fittings are pins secured to said panels and are adapted to extend beyond edges of said panels to engage said aircraft fittings, means on said panels to extend said pins beyond said edges and to retract said pins within said edges, said last-mentioned means including linkage locking means for locking said pins in the extending positions.

* * * * *